United States Patent Office 3,546,139
Patented Dec. 8, 1970

3,546,139
MOLYBDENUM, NIOBIUM, TANTALUM, ARSENIC IN CATALYSTS FOR VAPOR PHASE PRODUCTION OF ALPHA,BETA-UNSATURATED ACIDS
Howard S. Young, Kingsport, George C. Anderson, Johnson City, and Edgar L. McDaniel, Kingsport, Tenn., assignors to Eastman Kodak Company, Rochester, N.Y., a corporation of New Jersey
No Drawing. Continuation of application Ser. No. 653,340, July 14, 1967, which is a continuation-in-part of abandoned application Ser. No. 482,263, Aug. 24, 1965. This application Nov. 3, 1969, Ser. No. 873,668
Int. Cl. B01j 11/06, 11/32
U.S. Cl. 252—456                                          12 Claims

ABSTRACT OF THE DISCLOSURE

A novel catalyst for the oxidative conversion of propylene to acrylic acid by contacting a mixture of vaporized propylene and oxygen at a temperature from about 300° C. to about 500° C. therewith, comprising oxidized molybdenum, arsenic and at least one of oxidized niobium and oxidized tantalum. The acrylic acid may be subsequently converted to lower alkyl esters for use in preparing polymers for the plastics industry.

---

This application is a continuation of our copending U.S. application Ser. No. 653,340, filed July 14, 1967, now abandoned, entitled "Molybdenum, Niobium, Tantalum, Arsenic in Catalysts for Vapor Phase Production of Alpha,Beta-Unsaturated Acids" which in turn is a continuation-in-part of U.S. Ser. No. 482,263, filed Aug. 24, 1965 entitled "Process for Preparing Acrylic Acid and Catalysts Therefor," now abandoned.

This invention concerns the vapor phase oxidation of alpha-beta-unsaturated olefins to alpha-beta-unsaturated monocarboxylic acids in the presence of a novel catalyst. A specific aspect of the invention is the preparation of acrylic acid by reacting propylene and oxygen in the vapor phase in the presence of a novel catalyst combination of catalytically active molybdenum and at least one of catalytically active tantalum and niobium, with or without catalytically active arsenic. The invention is further concerned with the above novel catalysts per se, and with the processes for preparing the same.

It is known that certain alpha-beta-unsaturated olefins such as propylene are converted to the corresponding alpha,beta-unsaturated acids by catalytic oxidation of the olefin to the acid in the presence of certain co-precipitated. catalysts. For example, U.S. Pat. 3,065,264 to Koch et al. discloses the oxidation of propylene to acrylic acid in the presence of a co-precipitated catalyst comprising molybdenum oxide combined with nickel and/or cobalt wherein the atomic ratio of cobalt and/or nickel to molybdenum is 0.1:1 to 1:1. It is stated that such catalysts may also be promoted with oxides of boron, phosphorus and vanadium. The catalysts enumerated and the process conditions disclosed require the use of substantial amounts of water vapor in the feed stock. The problem involved with this process is that conversion of propylene to acrylic acid under such conditions is relatively low. It is evident that the Koch et al. patent discloses neither the use of oxidized tantalum and/or niobium as a promoter nor the use of the heteropoly acids of the present invention as hereinafter disclosed.

In U.S. Pat. 3,190,913 to Fetterly et al. and its corresponding Belgian counterpart 616,690 the oxidation of propylene or isobutylene to mixtures of acrolein and acrylic acid and methacrolein and methacrylic acid, respectively, is disclosed. The catalysts of Fetterly et al. are said to consist essentially of phosphomolybdic acid in combination with arsenic or a suitable compound or arsenic.

U.S. Pat. 3,192,259, also to Fetterly et al., teaches the catalytic vapor phase oxidation of propylene to acrylic acid and acrolein. The catalysts disclosed in this patent consist essentially of phosphomolybdic acid in combination with an oxide of tellurium.

There is no disclosure in either of these patents to Fetterly of the addition of niobium and/or tantalum to his catalyst. Such an addition, as will be more fully pointed out hereinafter, is one of the distinctly novel features of the present invention. In addition, there is no disclosure of the use of heteropoly acids other than phosphomolybdic acid, another of the distinctly novel features of this invention. Furthermore, as will be more fully explained hereinafter, a problem with the Fetterly process is that it produces a product mixture which has a much higher ratio of acrolein to acrylic acid than the product of the present invention. Moreover, in the Fetterly process the mole ratio of acrylic acid to acrolein is substantially less than unity, for example, 0.6 to 0.7; while in the process of our invention a much higher ratio of acrylic acid to acrolein in the product is obtained, as for example, values of the order of about 14:1 or greater.

The Fetterly process is also characterized by the employment of reaction temperatures substantially higher than those used in the process of the present invention with attendant disadvantages, one being an increased tendency toward degradation of the desired product, another the possibility of explosion by auto-ignition due to the higher temperatures involved.

The catalytic oxidation of propylene in the presence of a molybdenum oxide catalyst is disclosed by Margolis, Roginsky and Gracheva, J. Gen. Chem. U.S.S.R. (Engl. Transl.) 26, pp. 1541–3, 1956. These men teach that acetic acid, formic acid, acetaldehyde, and formaldehyde are produced when propylene is subjected to oxidation in the presence of $MoO_3$ as a catalyst under the conditions set forth in their aforesaid article. On repeating the work of these men, as closely as possible, we found (see Example I) that propylene is oxidized to acrylic acid, acetic acid, and acrolein, although the rate of oxidation of propylene over $MoO_3$ on an asbestos catalyst similar to that described by these men is too slow to be of commercial utility. This reference, of course, does not teach the use of oxidized niobium and/or tantalum together with a heteropoly acid of molybdenum as a catalyst over which propylene is oxidized to acrylic acid.

It is also known that certain unsaturated aldehydes are converted to the corresponding unsaturated carboxylic acids by catalytic oxidation of the aldehyde to the acid in the presence of certain catalysts. For example, U.S. Pat. 2,881,213, issued to Idol et al., discloses the oxidation of acrolein and methacrolein to acrylic and methacrylic acids in the presence of a catalyst comprising at least one of the oxides of molybdenum and chromium. It is evident that the Idol et al. patent discloses a catalyst containing neither the oxidized tantalum and/or niobium as a promotor nor the use of heteropoly acids as a source of oxidized molybdenum.

Thus, it is apparent that in the prior processes there are inherent deficiencies such as low yield, high acrolein/acrylic acid ratio in the product, high reaction temperature requirements with resultant product degradation, undesirable by-product formation, and low reaction rate.

Objects of the present invention therefore are: to provide a more efficient process including catalysts and their preparations for the conversion of alpha, beta-unsaturated olefins to the corresponding alpha,beta-unsaturated monocarboxylic acids, and more particularly to provide proved process and catalysts for the preparation of acrylic acid from propylene. Other objects, features, and advantages of this invention will become apparent from a consideration of the following detailed description.

These objects have been accomplished in accordance with the present invention through the discovery that contacting oxygen and a suitable olefin with the present novel catalyst composition results in substantial improvements over prior processes. In carrying out the process in accordance with the present invention, a feed mixture containing, for example, propylene and oxygen in the vapor phase and at elevated temperature is passed over the catalyst composition to form acrylic acid. The chemical reaction which takes place may be represented theoretically by the following equation:

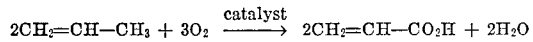

$$2CH_2=CH-CH_3 + 3O_2 \xrightarrow{catalyst} 2CH_2=CH-CO_2H + 2H_2O$$

It can be seen from this equation that the stoichiometric ratio of propylene to oxygen is 1:1.5. If air were the source of oxygen, the stoichiometric ratio of propylene to iar would be about 1:7.15. Ratios of olefin to oxygen in the reaction mixture of about 1:1.5 are typical although the ratio may be varied rather widely. For example, olefin to oxygen mole ratios of 1:0.5 to 1:10 are operative although ratios of 1.0.6 to 1:3 are preferred, and ratios of 1:0.8 to 1:1.6 are most preferred.

The oxygen employed in our process may be derived from any suitable source such as pure oxygen or mixtures of oxygen with inert gases such as nitrogen, $CO_2$, or flue gas. Air is an especially preferred source of oxygen.

Water may be added to the feed stream of olefin and oxygen if desired, but since it is not essential to the carrying out of our process it may be omitted. The effect of added water vapor varies with the catalyst employed. Where molybdenum was introduced as cerimolybdic acid, the addition of water vapor to the feed was beneficial, resulting in improvements in both conversion and yield.

The olefins used in the process of this invention are flammable compounds, and therefore it may be a desirable practice to avoid feeding flammable mixtures. This can be done in one of several ways, such as by controlling the ratio of olefin to oxygen or by adding an inert diluent such as nitrogen or $CO_2$. Another technique for suppressing flammability is the addition of a flammable diluent such as one or more of the lower alkanes. Thus, propane, ethane or methane might be added to render the feed mixture less flammable. As is known to those skilled in the art, the use of fluid-bed catalysts also aids materially in decreasing the hazards of explosion.

The temperature maintained during the reaction is variable within limits of about 300 to about 500° C., while temperatures of 325–425° C. are preferred and temperatures of 370–410° C. are most preferred. The reaction is not significantly pressure dependent and, therefore, the choice of operating pressures is generally governed by economic considerations. However, pressures ranging from about 1 to about 5 atmospheres are preferred, with higher pressures being operable.

Reference will now be made to the matter of contact times employed in carrying out the present invention. Contact time is defined as the average time, at reaction conditions, which the reactants spend in a volume equal to that of the bulk catalyst bed, assuming ideal behavior of the feed gases. Contact times of 0.1 to 20 seconds may be used with good results, but contact times of 0.5 to 10 seconds are preferred, and contact times of 0.5 to 4 seconds are most preferred.

The percent conversion of olefin to a specified product=

$$\frac{\text{moles product formed} \times 100}{\text{moles olefin fed}}$$

and the percent yield of the specified product=

$$\frac{\text{moles product formed} \times 100}{\text{moles olefin consumed}}$$

The process of our invention may be carried out by passing a mixture of the desired olefin, oxygen, and a diluent such as nitrogen at elevated temperatures over the catalyst, whereby a substantial portion of the feed stream is converted to desired products which are then recovered. Recovery of the products produced in accordance with this invention may be effected by conducting the effluent gases from the reactor through suitable cooling and separatory equipment. The unsaturated acid product is removed from the effluent stream of gases by any of the methods known to those skilled in the art. One such method involves scrubbing the effluent gases with water or other appropriate solvents to remove the desired products. In such a case, the unsaturated acid product is separated and purified by conventional means such as fractional distillation, extractive distillation, and solvent extraction. Unreacted olefin may be recovered from the gaseous stream by well-known techniques such as scrubbing with a suitable oil followed by steam stripping and then recirculated back to the reactor.

In view of the polymerizing tendency of the unsaturated products produced in accordance with the invention, the employment of polymerization inhibitors is desirable. These inhibitors, such as hydroquinone, hydroquinone monomethylether, and the like, are advantageously added to the crude product as the unsaturated aldehydes and acids are condensed, and suitable concentrations of inhibitors should then be maintained in the product throughout the recovery procedure. Concentrations of inhibitor in the range of about 1 to 1,000 p.p.m. in the product streams are preferred.

The above-mentioned novel oxidation catalysts of the present invention are solids which can be employed in the process in the form of granules, pellets, powders and the like. Since the oxidation of olefins to unsaturated acids and aldehydes is highly exothermic, it is preferable to employ the catalysts in the form of a solid supported catalyst bed which is "fluidized" by the upward flow of the vapor phase reaction mixture therethrough. The use of such a fluidized bed clearly facilitates control of the reaction temperature as is well known to those skilled in the art.

As aforesaid, the arsenic, molybdenum, tantalum and niobium components of the novel catalyst are in catalytically active states. By this it is meant that these components are in oxidized states in the catalyst. These oxidized states are attained by either direct oxidation of the individual components with or without the support, or by calcination of mixtures of the components with or without the support.

Among the preferred compounds of molybdenum suitable for use in these catalysts are molybdic acid and the soluble molybdenum heteropoly acids such as cerimolybdic acid, silicomolybdic acid and chromimolybdic acid, and salts of these acids. Examples of specific useful salts are ammonium heptamolybdate, ammonium hexamolybdochromiate and ammonium dodecamolybdocerate. Small amounts of metals other than the molybdenum, niobium and tantalum may also be included in the catalyst composition.

The structures of the heteropoly acids are difficult to determine owing to the very large size of their molecules. The acids may be best described as complex inorganic substances of relatively high molecular weight in which acid cations or oxides of metals or metalloids are associated with varying, frequently indeterminate amounts of combined water as water of hydration. The typical acid atom of a heteropoly acid, that is the cerium atom is ceriheteropoly acids, the silicon atom in silicoheteropoly acids, and so on, is regarded as the central atom of a nucleus. The oxygen atoms appear to be linked to the nuclear atom of cerium, silicon, and so on, in the same manner that molecules of ammonia are bound to the metal atom in the metallic amines. The oxygen atoms of these acids are then wholly or partially substituted by radicals such as $MoO_4$ to give the molybdenum heteropoly acids.

Molybdenum may also be supplied to the catalyst in the form of ammonium heptamolybdate or molybdenum trioxide. The ammonium heptamolybdate is quite useful in its commercially available form while the ammonium trioxide should be dissolved in ammonium hydroxide prior to incorporation into the catalyst composition. It is believed that during the calcination of the catalyst the molybdenum component, whatever its initial form, is ultimately converted at least in part to a form of molybdenum trioxide or some complex thereof. This speculation, however, should not be interpreted as a limitation of the scope of this invention. A further discussion of this matter is presented in a later portion of this specification.

The arsenic component of the catalyst may consist of one or more different compounds of arsenic such as elemental arsenic, arsenic (III) oxide, arsenic (V) oxide. The preferable forms of arsenic are the oxides, and arsenic (III) oxide is particularly preferred because of its cheapness and effectiveness. These arsenic compounds are incorporated into the catalysts in any one of several different ways as will be described in a later portion of this specification.

A further component of the catalyst is a compound of tantalum or niobium in oxidized states or a mixture of compounds of one or both of these elements. It is desirable that this component be incorporated into the catalyst preparation in a reactive or soluble form. Niobium pentoxide, when freshly precipitated from an aqueous solution is initially a reactive hydrous oxide, and is quite useful, but on standing some hours it apparently polymerizes to a considerable degree, yielding a much less reactive species. A particularly effective form of niobium or tantalum is the oxalate, which in each case is readily soluble in a water solution which contains a low concentration of oxalic acid. Other forms of these elements, such as the halides or freshly precipitated oxides or other complex organic derivatives such as the lactates, tartrates, or citrates may also be used in preparing the catalyst compositions of our invention. It is believed that under the conditions of catalyst preparation these materials are converted at least in part to niobium or tantalum pentoxides, or complexes thereof, but this speculation should not be construed so as to limit in any way the scope of our invention.

The catalyst compositions of this invention are preferably carried on a supporting material such as silica, silica-alumina, titania or silicon carbide. Supports such as these tend to impart desirable physical properties to the catalyst and also reduce the cost of the ultimate catalyst composition. It is to be emphasized here, though, that the catalyst has activity in the absence of a support, and the invention should not be construed as limited to supported catalysts alone. If a preformed support should be used, it is desirable that the average pore diameter of the material be in excess of 20 angstroms.

Because of the highly reactive nature of the vapor phase mixture containing oxygen and propylene in the presence of a catalyst at elevated temperatures, the exact structure of the catalyst is uncertain. The catalyst may be a mixture of one or more oxides or salts of molybdenum in admixture with one or more oxides or salts of niobium and/or tantalum. Furthermore, when arsenic is present, its structure is uncertain, being one or more oxides or salts thereof. It may also be that the total catalyst composition is a substantially homogeneous micromixture of loose chemical combinations of oxides of molybdenum and oxides of niobium and/or tantalum together with oxides of arsenic. It is most likely that the catalyst exists in both conditions with oxides or salts of molybdenum, niobium, tantalum, and arsenic as well as the various loose chemical combinations of oxides of molybdenum, niobium, tantalum and arsenic. In any event, it is known that the catalyst composition does contain materials in an oxidized state, i.e., the materials have an increased oxidation state (positive valence) in which the atoms have lost one or more electrons.

As pointed out hereinbefore, the exact composition of the catalyst at the time the reaction occurs is not known with certainty. However, when the molybdenum content of the catalyst is reported as $MoO_3$, the niobium content of the catalyst is reported as $Nb_2O_5$, the tantalum content is reported as $Ta_2O_5$, the arsenic content is reported as $As_2O_3$, and the central element contents of the heteropoly acid or its ammonium salt such as cerium, silicon, or chromium are reported as $CeO_2$, $SiO_2$, and $Cr_2O_3$, the broad, preferred and most preferred limits for the catalyst composition on a weight percent basis are as follows:

Catalyst Compositions, Wt. percent

| Expressed as component | Broad | Preferred | More Preferred | Most preferred |
|---|---|---|---|---|
| $MoO_3$ | 5–75 | 8–50 | 8–50 | 20–37 |
| $Nb_2O_5$ and/or $Ta_2O_5$ | 2–50 | 4–30 | 4–30 | 10–15 |
| $CeO_2$, $SiO_2$, or $Cr_2O_3$ | 0–7.5 | 0.5–0 | 0–5.0 | 0 |
| $As_2O_3$ | 0–25 | 3–15 | 3–15 | 4–10 |
| Support | 0–90 | 0–85 | 30–70 | 38–66 |

METHOD OF CATALYST PREPARATION

As aforesaid, the catalysts of the invention are prepared by any of several suitable methods. For example, the molybdenum component in any of its previously described forms and aqueous niobium oxalate or tantalum oxalate may be used in solution to impregnate suitable supports such as silica gel, kieselguhr, silicon carbide and the like. The preparation is then dried, calcined and impregnated with a solution containing an arsenic oxide.

Alternatively, the catalyst is prepared by impregnating the support with a solution of the molybdenum component and a niobium or tantalum oxalate. The catalyst is then dried, calcined, and charged to a reactor. Following these steps, arsenic is added to the catalyst as will be described hereinafter.

In another and preferred method of catalyst preparation, the various catalyst components such as the molybdenum compound, niobium or tantalum oxalate, and an arsenic oxide are added to suitable silica sols, such as silica aquasols, yielding a mixture which is dried and calcined. A variation of this technique consists of omitting the arsenic oxide from the silica sol mixture. Upon drying and calcining this alternate preparation, an arsenic-free catalyst is obtained. This catalyst is then charged to the reactor and arsenic oxide added to it to yield an active and selective catalyst.

Yet another method of catalyst preparation involves the synthesis of a heteropoly acid or its ammonium salt in situ during the catalyst preparation. Thus, in the case of cerimolybdic acid catalyst the silica sol is first acidified and then mixed with ammonium heptamolybdate. This mixture is then converted to ammonium cerimolybdate in silica sol by the addition of ceric ammonium nitrate thereto. Upon adding niobium or tantalum oxalate and an arsenic oxide to this mixture, followed by drying and calcination, one obtains an active and selective catalyst. This in situ preparation technique may be used with other heteropoly acids of molybdenum, or ammonium salts of these acids, such as ammonium chromimolybdate and silicomolybdic acid.

While it is frequently preferable, as is well known to those skilled in the art, to calcine a catalyst preparation prior to charging the catalyst to the reactor, the catalyst of this invention may also be prepared and charged to the reactor before calcination. Calcination is then accomplished by heating the catalyst to an elevated temperature for a sufficient length of time prior to performing the subject process. This mode of catalyst preparation is useable whether or not arsenic is present in the catalyst composition at this point. If arsenic is absent from the preparation, it may be added before, during or after calcination, as described hereinafter.

When the arsenic component is initially omitted from the catalyst preparation, there are several methods available for the ultimate addition of the arsenic. A particularly preferred method is to charge the arsenic-free catalyst to a reactor, heat the catalyst to temperatures on the order of 150° to 450° C. and then pass a gaseous stream such as air containing a volatile form of arsenic through the heated catalyst bed. Thus, arsenic (III) oxide vapors are passed through the catalyst bed for a time sufficient to generate the desired arsenic content in the catalyst.

Another preferred method involves the bulk addition of a volatile arsenic compound such as arsenic (III) oxide to the catalyst composition followed by heating the composition at temperatures of 150–450° C. while passing a gas such as air through the composition at low linear velocities to aid in absorption of the arsenic oxide. This latter mode of operation is particularly preferred with fluid-bed catalyst systems.

During use of these arsenic-containing catalysts, volatile compounds of arsenic, notably arsenic (III) oxide, are slowly evolved from the material and are carried away from the catalyst in the product stream. In order to offset this continual loss, arsenic may be added to the catalyst during use, either continuously or discontinuously, so that a given level of arsenic content is maintained in the reaction zone. A particularly effective method of maintaining the desired concentration of arsenic is to pass a portion of the feed stream containing olefin and oxygen over a bed of a volatile arsenic compound such as elemental arsenic or arsenic (III) oxide maintained at suitably elevated temperature. This suitably elevated temperature is chosen so that a desired partial pressure of the compound is maintained in the feed to the catalyst. Alternatively, a compound of arsenic (III) oxide or arsenic (V) oxide may be added to the catalyst either continuously or at intervals as, for example, by a suitable solids feeder.

When calcining the catalysts of the present invention, temperatures in excess of 600° C. should be avoided since they tend to decrease the ultimate catalytic activity of the composition.

The catalysts of this invention may be regenerated at intervals if necessary by passing an oxidizing gaseous mixture over the catalyst at elevated temperatures. Air or air diluted with flue gas or steam is an excellent agent for such regeneration.

In the following examples, several of the preferred embodiments of the invention are set forth. These examples are included merely for the purpose of illustration and should not be construed as a limitation of the scope of the invention. Moreover, the compositions of the catalyst set forth are those that were calculated from the amounts of the respective components used in the preparation of these catalysts. These figures are not necessarily intended to represent the actual operating concentrations after the catalyst has entered into the reaction phase of the process. In addition, the percentages of catalyst components are given using the oxide forms of the components for designation purposes only. The use of these terms should not be interpreted as an indication of the state of these components during the reaction phase of the process.

EXAMPLE 1

A catalyst comprising 25 weight percent $MoO_3$ on asbestos support (75 weight percent) duplicating that of Example 6 of J. Gen. Chem. (U.S.S.R. Eng. Trans.), 26, 1542 (1956) as closely as possible was prepared as follows. Twenty-five grams of $MoO_3$ as

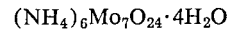

$(NH_4)_6Mo_7O_{24} \cdot 4H_2O$ was dissolved in a sufficient amount of water to make 120 ml. of solution which was stirred thoroughly with 75 g. of Alcoa "Grade AB-6B Asbestos Shorts" to form a paste-like mixture. The mixture was heated on a hot plate with constant stirring for 20 minutes at approximately 120° C. after which it was calcined for two hours at 250° C. followed by calcination at 450° C. for two hours. The catalyst thus formed was sieved and 10 ml. (4.9 g.) of 30 x 60-U.S. mesh material was charged to a 1.6 cm. I.D. Pyrex fixed-bed reactor which was fitted with a 0.9 cm. O.D. thermowell.

A run was conducted using the conditions specified in Example 6 of the Russian paper referred to above. The reaction temperature was 400° C. and the contact time was 2 seconds. The feeds to the reactor consisted of 12.18 ml./min. of propylene, 48.8 ml./min. of nitrogen and 60.88 ml./min. of air. These volumes refer to standard temperature and pressure conditions. In this 116 minute run, the percent conversions to acrylic acid, acetic acid, and acrolein were 0.034 percent, 0.1045 percent and 0.373 percent, respectively. The space-time yield of acrylic acid was 0.0051 lb. per cubic foot of catalyst per hour.

EXAMPLE 2

A catalyst calculated to comprise by weight of the total catalyst, including the support, 5 percent $As_2O_5$, 5 percent $Nb_2O_5$, and 35 percent $MoO_3$ on a silica support (55 percent) was prepared as follows. To 733 g. of stirred 30 percent silica aquasol, ammonia stabilized, were added 29 ml. of dilute nitric acid (1 part, by volume, of concentrated nitric acid to 3 parts of water) followed by a solution of 173 g. of ammonium heptamolybdate tetrahydrate in 150 ml. of water. Then a solution of 59.3 g. of niobium oxalate, containing 20 g. of $Nb_2O_5$, in 100 ml. of dilute aqueous oxalic acid was added, followed by a solution of 20 g. of $As_2O_5$ in 50 ml. of water. The resulting mixture was heated, with stirring, to the boiling point and then evaporated to a solid mass on a steam bath. After overnight drying in an oven at 120° C., the dried mixture was calcined in a muffle furnace for 3 hours at 250° C. and for 2 hours at 450° C. The catalyst was crushed, sieved, and 150 ml. of 80 x 200-mesh material was charged to the laboratory reactor.

Reaction temperature was 400° C., and the contact time was 3.3 seconds. The feed comprised 96 ml. of propylene, 722 ml. of air, and 289 ml. of water vapor per minute, STP. Over 52 minutes of reaction, 3.78 g. of acrylic acid, 1.15 g. of acetic acid, and 0.3 g. of acrolein were recovered in the product. The conversion to acrylic acid was 23.6 percent at 39.6 percent yield; the conversion to acetic acid was 8.6 percent at 14.4 percent yield; and the conversion to acrolein was 2.3 percent at 3.8 percent yield.

EXAMPLE 3

The catalyst of Example 2 was regenerated by fluidizing it with air at 450° C. for 30 minutes, and then it was tested at the same conditions as before, except that the water vapor in the feed stream of Example 1 was replaced with an equivalent amount of nitrogen. Thus, no water vapor was added to the feed stream. Over 52 minutes of reaction, 2.84 g. of acrylic acid, 0.62 g. of acetic acid, and 0.16 g. of acrolein were obtained in the product. The conversion to acrylic acid was 17.6 percent at 32.0 percent yield; the conversion to acetic acid was 4.6 percent at 8.4 percent yield; and the conversion to acrolein was 1.3 percent at 2.3 percent yield.

EXAMPLE 4

A catalyst calculated to comprise by weight of the total catalyst, including the support, 3 percent $As_2O_5$, 3 percent $Nb_2O_5$, and 21 percent $MoO_3$ on silica (73 percent support) was prepared using spray-dried silica gel as the support. The spray-dried silica gel (Davison MSID) was sieved and 99.4 g. of 80 x 200-mesh material was exposed to water vapor in vacuo for 4 days at room temperature. To this silica gel was added a solution of 35.3 g. of ammonium heptamolybdate tetrahydrate in 120 ml. of water, followed by 200 ml. of water to yield a moist mass. After 2 hours standing at room temperature, the mass was heated, with stirring, to a final temperature of 150° C. over a period of 45 minutes and then the preparation was cooled.

A solution of 4.1 g. of $As_2O_5$ in 25 ml. of water was added to 75 ml. of a solution of niobium oxalate which contained 4.1 g. of $Nb_2O_5$. The combined solution was added to the molybdena-silica system, prepared as described in the preceding paragraph, after which 150 ml. of water were added. After standing for 30 minutes, the moist mass was heated to 150° C. and dried at this temperature. The dried catalytic mass was sieved and 150 ml. of 80 x 200-mesh material thus obtained were charged to the laboratory reactor. The catalyst was fluidized for 1½ hours in air at 450° C. before being tested.

The catalyst obtained as just described was tested at 400° C. and 4.4 seconds contact time with a feed comprising 72 ml. of propylene, 541 ml. of air, and 217 ml. of water vapor per minute, STP. Over 69 minutes of reaction, 1.45 g. of acrylic acid, 0.69 g. of acetic acid, and 0.39 g. of acrolein were obtained in the product. The conversion to acrylic acid was 9.0 percent at 20.5 percent yield, the conversion to acetic acid was 5.2 percent at 11.7 percent yield; and the conversion to acrolein was 3.2 percent at 7.1 percent yield.

EXAMPLE 5

A catalyst was prepared as in Example 2, except that the arsenic pentoxide was omitted from the preparation. Thus, this catalyst comprised 5.3 percent $Nb_2O_5$ and 36.9 percent $MoO_3$ on silica (57.8 percent support) by weight of the total catalyst. A steel fluid-bed reactor of geometry similar to that of the laboratory Vycor reactor was charged with 150 ml. (116 g.) of the catalyst in 80 x 200-mesh size. The catalyst was tested at 400° C. and 2.24 seconds contact time with a feed stream comprising 144 ml. of propylene, 1,082 ml. of air, and 433 ml. of water vapor per minute, STP. The conversion to acrylic acid was 3.8 percent at 6.4 percent yield; the conversion to acetic acid was 16.1 percent at 27.2 percent yield; and the conversion to acrolein was 1.4 percent at 2.3 percent yield.

EXAMPLE 6

An arsenic trioxide vaporizer was inserted into the feed line leading to the reactor, and $As_2O_3$ was fed as vapor in the feed, which was otherwise the same as that employed in Example 5, at a rate of 2.0 g. of $As_2O_3$ (.925 percent $As_2O_3$ and 57.8 percent support) per 24-hour day as the propylene-air-stream feed was continued. The conversion to acrylic acid increased and the conversion to acetic acid decreased as the arsenic trioxide feed was continued. Thirteen hours after the $As_2O_3$ feed was started, the conversion to acrylic acid was 11.9 percent at 20.6 percent yield; the conversion to acetic acid was 16.2 percent at 28.1 percent yield; and the conversion to acrolein was 1.1 percent at 1.9 percent yield. Fifty-eight hours after the start of the $As_2O_3$ feed, the conversion to acrylic acid was 22.0 percent at 32.8 percent yield; the conversion to acetic acid was 14.8 percent at 22.2 percent yield; and the conversion to acrolein was 1.5 percent at 2.2 percent yield.

EXAMPLE 7

A $Nb_2O_5$-$MoO_3$-$SiO_2$ catalyst of the same composition as in Example 5 was tested in the steel fluid bed reactor using 150 ml. of 80 x 200-mesh catalyst. Arsenic trioxide was fed to the catalyst in air at a feed rate of 8.3 g. $As_2O_3$ (3.45 percent $As_2O_3$ and 55.8 percent support) per 24-hour day for 12 hours with the catalyst fluidized with air at 400° C. The catalyst was tested at 400° C. and 1.5 seconds contact time with a feed stream comprising 144 ml. of propylene, 1,487 ml. of air, and 625 ml. of water vapor per minute, STP. Arsenic trioxide feed was continued during the run at a feed rate of 2.7 g. per 24-hour day. The conversion to acrylic acid was 24.6 percent at 44.5 percent yield, the conversion to acetic acid was 7.0 percent at 12.6 percent yield; and the conversion to acrolein was 0.5 percent at 0.9 percent yield.

EXAMPLE 8

A catalyst comprising 2.5 percent $As_2O_5$, 2.5 percent $Nb_2O_5$, and 17.5 $MoO_3$ on silica (77.5 percent support) by weight of the total catalyst, was prepared in the same manner as in the preparation in Example 2, with appropriate changes in the quantities of reagents taken. Then 150 ml. of the catalyst in 80 x 200-mesh size was tested using the same conditions as in Example 2. Over 52 minutes of reaction, 1.72 g. of acrylic acid, 0.67 g. of acetic acid, and 0.3 g. of acrolein were obtained in the product. The conversion to acrylic acid was 10.7 percent at 20.4 percent yield; the conversion to acetic acid was 5.0 percent at 9.5 percent yield; and the conversion to acrolein was 2.4 percent at 4.5 percent yield.

EXAMPLE 9

A catalyst comprising 5 percent $As_2O_5$, 10 percent $Nb_2O_5$, and 35 percent $MoO_3$ on silica (50 percent support), by weight of the total catalyst, was prepared in the same manner as in Example 2, with the appropriate changes in the quantities of niobium oxalate and silica sol taken. Then 150 ml. of the catalyst in 80 x 200-mesh size was tested at the same conditions as in Example 2. Over 52 minutes of operation, 4.32 g. of acrylic acid, 1.97 g. of acetic acid, and 0.3 g. of acrolein were obtained in the product. The conversion to acrylic acid was 26.9 percent at 38.1 percent yield; the conversion to acetic acid was 14.7 percent at 20.8 percent yield; and the conversion to acrolein was 2.4 percent at 3.4 percent yield.

EXAMPLE 10

The catalyst of Example 9 was tested at 310° C., at 3.3 seconds contact time, with a feed stream comprising 111 ml. of propylene, 833 ml. of air, and 333 ml. of water vapor per minute, STP. Over 45 minutes of reaction, 1.23 g. of acrylic acid, 1.50 g. of acetic acid, and 0.6 of acrolein were obtained in the product. The conversion to acrylic acid was 7.7 percent at 17.2 percent yield; the conversion to acetic acid was 11.2 percent at 25.1 percent yield; and the conversion to acrolein was 4.8 percent at 10.7 percent yield.

EXAMPLE 11

The catalyst of Example 9 was tested at 400° C. and 3.3 seconds contact time, with a feed stream comprising 76 ml. of propylene, 572 ml. of air, and 458 ml. of water vapor per minute, STP. Over 66 minutes of reaction, 5.30 g. of acrylic acid, 2.82 g. of acetic acid, and 0.25 g. of acrolein were obtained in the product. The conversion to acrylic acid was 30.3 percent at 37.2 percent yield, the conversion to acetic acid was 19.1 percent at 23.5 percent yield; and the conversion to acrolein was 1.9 percent at 2.3 percent yield.

EXAMPLE 12

A catalyst comprising 4.3 percent $As_2O_3$, 5 percent $Nb_2O_5$, and 35 percent $MoO_3$ on silica (55.7 percent support), by weight of the total catalyst, was prepared as in Example 2, except that a slurry of $As_2O_3$ in water was used instead of the $As_2O_5$ solution of Example 2. Then 150 ml. of the catalys in 80 x 200-mesh size was tested using the same conditions as in Example 2. Over 52 minutes of reaction, 4.15 g. of acrylic acid, 1.29 g. of acetic acid, and 0.11 g. of acrolein were obtained in the product. The conversion to acrylic acid was 25.8 percent at 36.9 percent yield; the conversion to acetic acid was 9.6 percent at 13.8 percent yield; and the conversion to acrolein was 0.9 percent at 1.2 percent yield.

EXAMPLE 13

A catalyst comprising 5 percent $As_2O_5$, 5 percent $Nb_2O_5$, and 10 percent $MoO_3$ on silica (80 percent support), by weight of the total catalyst, was prepared as in Example 2, with appropriate modification in the quantities of reagents taken. This catalyst was tested in the steel fluid-bed reactor, using 150 ml. of the catalyst in 80 x 200-mesh size, at 400° C. and 3.3 seconds contact time, with a feed stream comprising 96 ml. of propylene, 722 ml. of air, and 289 ml. of water vapor per minute, STP. Over 52 minutes of reaction, 2.95 g. of acrylic acid, 0.78 g. of acetic acid, and 0.67 g. of acrolein were obtained in the product. The conversion to acrylic acid was 18.4 percent at 32.8 percent yield; the conversion to acetic acid was 5.8 percent at 10.4 percent yield; and the conversion to acrolein was 5.3 percent at 9.5 percent yield.

EXAMPLE 14

A catalyst comprising 15 percent $As_2O_5$, 15 percent $Nb_2O_5$, and 35 percent $MoO_3$ on silica (35 percent support), by weight of the total catalyst, was prepared as in Example 2. 150 ml. of the catalyst in 80 x 200-mesh size was tested in the steel fluid-bed reactor at 400° C. and 1.0 second contact time. The feed stream comprised 456 ml. of propylene, 2740 ml. of air, and 456 ml. of water vapor per minute, STP. Over 11 minutes of reaction, 3.81 g. of acrylic acid, 0.52 g. of acetic acid, and 0.19 g. of acrolein were obtained. The conversion to acrylic acid was 23.6 percent at 58.9 percent yield, the conversion to acetic acid was 3.8 percent at 9.6 percent yield; and the conversion to acrolein was 1.6 percent at 3.9 percent yield.

EXAMPLE 15

A catalyst comprising 10 percent $As_2O_5$, 10 percent $Nb_2O_5$, and 35 percent $MoO_3$ on silica (45 percent support), by weight of the total catalyst, was prepared as in Example 2 and tested in the fluid-bed reactor at 400° C. and 1.0 sec. contact time. A feed of the same composition as in Example 14 was passed over a bed of $As_2O_3$ at 150° C. in an arsenic trioxide vaporizer, and the $As_2O_3$-saturated stream was fed to the reactor. Over 11 minutes of reaction, 3.75 g. of acrylic acid, 0.93 g. of acetic acid, and 0.15 g. of acrolein were obtained in the product. The conversion to acrylic acid was 23.2 percent at 48.5 percent yield; the conversion to acetic acid was 6.9 percent at 14.5 percent yield; and the conversion to acrolein was 1.3 percent at 2.6 percent yield.

EXAMPLE 16

A catalyst comprising 4.3 percent $As_2O_3$, 8 percent $Ta_2O_5$, and 35 percent $MoO_3$ on silica (52.7 percent support), by weight of the total catalyst, was prepared. To 878 g. of 30 percent silica sol, ammonia stabilized, was added sufficient dilute nitric acid to decrease the pH to 6. Then 216 g. of ammonium heptamolybdate dissolved in 225 ml. of water was added to the stirred silica sol, followed by 171 g. of a tantalum oxalate solution containing the equivalent of 40 g. of $Ta_2O_5$. Then a hot slurry of 21.5 g. of $As_2O_3$ in 40 ml. of water was added. The resulting gel was broken up and stirred with heating; it thinned and then set again to a gel. It was transferred to a steam bath, dried with intermittent stirring, and calcined in a muffle furnace for 3 hr. at 250° C. and 2 hr. at 450° C. It was crushed, sieved, and 150 ml. of 80 x 200-mesh material was charged to the steel fluid-bed reactor.

The catalyst obtained as just described was tested at 400° C. and 3.3 sec. time with a feed stream comprising 96 ml. of propylene, 722 ml. of air, and 289 ml. of water vapor per min. Over 52 min. of reaction, the product contained 3.40 g. of acrylic acid, 1.34 g. of acetic acid, and 0.14 g. of acrolein. The conversion to acrylic acid was 29.6 percent at 42.2 percent yield; the conversion to acetic acid was 14.1 percent at 20.1 percent yield; and the conversion to acrolein was 1.6 percent at 2.2 percent yield.

EXAMPLE 17

The catalyst of the preceding example was tested at 400° C. and 2.2 sec. contact time with a feed stream comprising 180 ml. of propylene, 1298 ml. of air, and 180 ml. of water vapor per minute, STP. Over 28 min. of reaction, 4.06 g. of acrylic acid, 1.53 g. of acetic acid, and 0.22 g. of acrolein were obtained in the product. The conversion to acrylic acid was 25.0 percent at 38.7 percent yield; the conversion to acetic acid was 11.3 percent at 17.5 percent yield; and the conversion to acrolein was 1.7 percent at 2.7 percent yield.

EXAMPLE 18

A catalyst was prepared which contained by weight of the total catalyst, including the support, 9.4 percent $Nb_2O_5$ and 42.7 percent $MoO_3$ on a silica support (47.9 percent support). The preparation was larger in scale but similar to that of Example 2, except that no arsenic was used and nitric acid was not added to the silica aquasol. Following calcination, crushing, and sieving, 2.36 liters of the catalyst in 80 x 150-mesh size was charged to a 6-inch diameter steel fluid-bed reactor along with granular $As_2O_3$ equivalent to 5 weight percent of the total catalyst. The catalyst was heated to 400° C. while fluidized in air and then it was used to synthesize acrylic acid. The data tabulated in Table 1 were then collected. During the operation, arsenic trioxide was fed in aqueous solution to a vaporizer in the feed stream at a rate of 41 g. per 24-hour day. The process was operated continuously for 72 hours. The data given for each set of conditions set forth in Table 1 is based upon 4 hours operation.

TABLE 1

| Temperature, °C.: | Contact time, sec. | Feed stream, $C_3H_6$:Air: steam, moles | To acrylic acid | | To acetic acid | |
|---|---|---|---|---|---|---|
| | | | Percent conv. | Percent yield | Percent conv. | Percent yield |
| 382 | 1.18 | 1:5.5:1.9 | 19.3 | 49.3 | 8.7 | 22.2 |
| 382 | 2.11 | 1:4.4:0.43 | 17.9 | 50.7 | 4.7 | 13.3 |
| 393 | 0.59 | 1:2.6:1.5 | 12.3 | 54.5 | 3.5 | 15.4 |
| 340 | 1.53 | 1:5.4:1.4 | 12.8 | 41.3 | 6.2 | 20.0 |
| 430 | 1.49 | 1:5.3:1.4 | 16.0 | 33.4 | 4.1 | 8.5 |
| 381 | 0.60 | 1:3.1:0.35 | 11.2 | 81.0 | 2.4 | 17.3 |

EXAMPLE 19

A catalyst was prepared which contained 15 parts of $Nb_2O_5$, 35 parts of $MoO_3$ and 35 parts of $SiO_2$ by weight (41.1 percent support). 150 ml. of the catalyst in 80 x 200-mesh size were charged to a laboratory fluid-bed reactor. Sufficient $As_2O_3$ were added to the catalyst to yield an $As_2O_3$ content of 6 percent, and during use for acrylic acid synthesis the feed gas stream was passed through a saturator containing solid $As_2O_3$, which was maintained at 153° C., before the feed stream entered the reactor. The data of Table 2 below were collected. As seen from the data high conversions and yields were obtained.

TABLE 2

| Temperature, °C.: | Contact time, sec. | Feed stream, $C_3H_6$:Air: steam, moles | To acrylic acid Percent conv. | To acrylic acid Percent yield | To acetic acid Percent conv. | To acetic acid Percent yield |
|---|---|---|---|---|---|---|
| 350 | 1.0 | 1:6:1 | 17.5 | 69.1 | 5.5 | 21.9 |
| 350 | 1.6 | 1:6:1 | 19.2 | 58.6 | 6.5 | 19.7 |
| 350 | 3.2 | 1:6:1 | 25.0 | 51.1 | 9.5 | 19.5 |
| 375 | 1.0 | 1:6:1 | 22.1 | 54.7 | 6.3 | 15.6 |
| 375 | 1.0 | 1:6:0 | 20.9 | 60.4 | 5.3 | 15.3 |
| 400 | 1.0 | 1:6:1 | 25.6 | 48.6 | 5.9 | 11.2 |

EXAMPLE 20

Supported catalysts containing 5 weight percent arsenic pentoxide, 5 weight percent niobium pentoxide, and 35 weight percent molybdenum oxide and 55 weight percent of various supports were prepared.

A silicon carbide supported catalyst was prepared by impregnating silicon carbide with the active catalytic ingredients.

A silica-alumina catalyst was prepared according to the general procedure of Example 2 by adding aluminum nitrate to the silica sol prior to adding the ammonium heptamolybdate.

A titanium dioxide supported catalyst was prepared by adding pigment grade $TiO_2$ to an ammonium heptamolybdate solution and then forming a gel by the addition of niobium oxalate. Arsenic pentoxide solution was then added to yield a thin slurry which was heated until it thickened, then dried and calcined.

These supported catalysts were then tested in a fixed bed reactor. The results are summarized in Table 3 below.

TABLE 3

| Catalyst composition | Temp., °C. | Contact time, sec. | Feed stream, $C_3H_6$:air: $H_2O$, moles | To acrylic acid Percent conv. | To acrylic acid Percent yield | To acetic acid Percent conv. | To acetic acid Percent yield |
|---|---|---|---|---|---|---|---|
| (1) 5% $As_2O_5$ plus 5% $Nb_2O_5$ plus 35% $MoO_3$ plus 55% SiC | 400 | 2.4 | 1:7.5:3 | 23.2 | | 4.7 | |
| (2) 5% $As_2O_5$ plus 5% $Nb_2O_5$ plus 35% $MoO_3$ plus 55% $SiO_2$-$Al_2O_3$ (13 parts $Al_2O_3$ plus 87 parts $SiO_2$) | 402 | 2.4 | 1:7.5:3 | 7.3 | | 14.6 | |
| Added 5% $As_2O_3$ | 402 | 2.4 | 1:7.5:3 | 30.2 | | 13.9 | |
| (3) 5% $As_2O_5$ plus 5% $Nb_2O_5$ plus 35% $MoO_3$ plus 55% $TiO_2$ (RA-40) | 400 | 2.4 | 1:7.5:3 | 42.6 | 63.1 | 11.3 | 16.8 |

EXAMPLE 21

A catalyst was prepared which contained no support; this catalyst comprised 11 percent $As_2O_5$, 11 percent $Nb_2O_5$, and 78 percent $MoO_3$. To 100 ml. of water was added 96.0 g. of ammonium heptamolybdate tetrahydrate. To the stirred and heated solution was added 144.5 g. of aqueous oxalic acid solution containing niobium oxalate equivalent to 11 g. of $Nb_2O_5$. A heavy white gel formed. Then a solution of 11.1 g. of arsenic pentoxide in 50 ml. of water was added to the gel, which broke up on this addition. The slurry was heated on a hot plate with stirring for 1 hour, and then was dried on a steam bath. The preparation was calcined 3 hours at 250° C. and 2 hours at 450° C. in a muffle furnace. The catalyst was crushed, sieved, and 10 ml. of 28 x 60-mesh catalyst was charged to a small fixed-bed reactor. The exit line from this reactor was connected to a sampling valve attached to a gas chromatograph. This allowed sampling of the reactor effluent at will for gas chromatographic analysis of the reactor effluent for acrylic acid and acetic acid content. By suitable calibrations the conversions to acrylic acid and acetic acid could be determined.

The catalyst was tested at 400° C. and 2.4 seconds contact time with a feed stream where the mole ratios of propylene:air:steam were 1:7.5:3. The conversion to acrylic acid was 30.0 percent and the conversion to acetic acid was 11.5 percent.

EXAMPLE 22

Another catalyst was made, with no support, in a preparation involving the formation of a niobium and molybdenum gel. The preparation, which contained 15 parts by weight of $Nb_2O_5$ and 35 parts by weight of $MoO_3$, was prepared as follows. An ammonium molybdate solution was prepared from 20.6 g. $MoO_3$, 20 ml. water, and 10 ml. concentrated $NH_4OH$. This solution was added to 93 ml. of solution of niobium oxalate which contained the equivalent of 8.8 g. $Nb_2O_5$. The mixture was heated on a steam bath till it formed a blue gelatinous precipitate. Following the customary drying, calcining, and sieving the catalyst was tested in the small fixed-bed reactor after the catalyst had been treated with 3 percent of its weight of $As_2O_3$ at elevated temperatures. At 400° C. and 2.4 seconds with a feed stream comprising 1 mole of propylene: 7.5 moles air: 3 moles of steam, the conversion to acrylic acid was 23.8 percent, and the conversion to acetic acid was 8.0 percent.

EXAMPLE 23

A set of catalysts was prepared wherein the ratios of arsenic pentoxide, niobium pentoxide, and molybdic oxide were held constant while the total amount of these materials was varied. When tested at 400° C., 2.4 seconds and with propylene:air:steam mole ratios of 1:7.5:3 in the feed stream, the data shown in Table 4 were collected.

TABLE 4

| Catalyst composition, nominal | | | | Conv. to acrylic acid, percent | Conv. to acetic acid, percent |
|---|---|---|---|---|---|
| $As_2O_5$, percent | $Nb_2O_5$, percent | $MoO_3$, percent | $SiO_2$, percent | | |
| 3.2 | 2.1 | 4.6 | 90 | 4.1 | 2.7 |
| 9.7 | 6.4 | 13.9 | 70 | 29.0 | 4.4 |
| 16.2 | 10.7 | 23 | 50 | 37.3 | 6.6 |
| 22.6 | 15.0 | 32.4 | 30 | 39.1 | 12.6 |
| 29.1 | 19.3 | 41.6 | 10 | 7.5 | 1.5 |

EXAMPLE 24

A series of runs were made in a fixed-bed reactor with the individual components tested singly or in pairs upon silica. The data, shown in Table 5, show that the three components together show activity and selectivity far in excess of that one should expect from the single oxides or pairs of oxides on silica. In each case the feed composition was the same as in Example 23. The contact time was approximately 2.4 seconds, and the temperatures are as shown in Table 5 below.

product with water by decantation, it was collected on a Büchner funnel, washed with methanol, and air-dried.

To 667 g. of stirred ammonia-stabilized 30 percent silica sol which had been acidified to a pH of 6 with nitric acid was added 183 g. of pulverized ammonium dodecamolybdocerate. Then a solution of 20 g. of arsenic (V) oxide in

TABLE 5

| Catalyst composition | Temp., °C. | Conv. to acrylic acid | Remarks |
| --- | --- | --- | --- |
| (1) 30% $MoO_3$ plus 70% $SiO_2$ | 475 | 1.4% | Slightly lower conversion to acetic acid. |
| (2) 5% $Nb_2O_5$ plus 95% $SiO_2$ | 450 | None detected | Trace of acetic acid formed. |
| (3) 15% $As_2O_5$ plus 85% $SiO_2$ | 400 | Trace | |
| (4) 5% $As_2O_5$ plus 5% $Nb_2O_5$ plus 90% $SiO_2$ | 417 / 472 | None detected / ....do.... | } Little oxidation evident. |
| (5) 5% $Nb_2O_5$ plus 35% $MoO_3$ plus 60% $SiO_2$ | 390 | 8% | Conversion to acetic acid was much higher. |
| (6) 13% $As_2O_5$ plus 35% $MoO_3$ plus 52% $SiO_2$ | 400 | None detected | No acetic acid detected; little oxidation evident. |

EXAMPLE 25

A catalyst comprising 45 percent $Nb_2O_5$ and 15 percent $MoO_3$ on silica (40 percent support) was prepared and tested in a fixed bed reactor. After the addition of about 10 percent $As_2O_3$ based on the weight of catalyst, at 400° C., 2.4 seconds, and a feed stream comprising 1 mole of propylene:7.5 moles air:3 moles of steam, the conversion to acrylic acid was 26.4 percent and the conversion to acetic acid was 8.0 percent.

EXAMPLE 26

A catalyst comprising 10 parts $Nb_2O_5$, 35 parts $MoO_3$, and 45 parts silica (50 percent support) was prepared. To 750 g. of ammonia-stabilized 30 percent silica aquasol was added 677 g. of solution of aqueous niobium oxalate containing the equivalent of 50 g. $Nb_2O_5$. Then 216 g. of ammonium heptamolybdate dissolved in 225 ml. of water was added quickly; the solution was vigorously stirred and immediately poured into a large Pyrex dish. A light blue gel formed in about 1 minute. The gel was allowed to stand for about 2 hours, then was dried on a steam bath at 70° C. for 60 hours and then was dried overnight in an oven at 100° C. It was calcined 3 hours at 250° C. and 2 hours at 450° C., and then was ground in a hammer mill. Then 150 ml. (171 g.) of 80 x 200-mesh catalyst was charged to the laboratory reactor, and 19 g. of $As_2O_3$ was added to the reactor. The catalyst was fluidized in air at elevated temperature and then tested at 400° C. and 1 second contact time with a feed stream containing propylene:air:steam in a 1:6:1 mole ratio. The conversion to acrylic acid was 20.5 percent at 52.1 percent yield, and the conversion to acetic acid was 6.3 percent at 16.0 percent yield.

EXAMPLE 27

A series of catalysts containing $As_2O_5$, $Ta_2O_5$, and $MoO_3$ were tested in a fixed-bed reactor at 400° C., 2.4 seconds contact time, and with a feed stream containing propylene, air, and steam in a 1:7.5:3 mole ratio. The catalyst compositions and results are shown in Table 6.

TABLE 6

| Catalyst composition | | | | To acrylic acid | | To acetic acid | |
| --- | --- | --- | --- | --- | --- | --- | --- |
| $As_2O_5$, percent | $Ta_2O_5$, percent | $MoO_3$, percent | $SiO_2$, percent | Conv., percent | Yield, percent | Conv., percent | Yield, percent |
| 10 | 7.6 | 22.4 | 60 | 22.8 | 46.8 | 6.4 | 13.2 |
| 10 | 13 | 17 | 60 | 25.8 | 46.7 | 6.1 | 11.0 |
| 10 | 17.1 | 12.9 | 60 | 23.0 | 49.9 | 5.4 | 11.8 |
| 10 | 20.2 | 9.8 | 60 | 2.8 | 7.8 | 2.4 | 6.8 |

EXAMPLE 28

A catalyst comprising 5 percent arsenic oxide, 5 percent niobium oxide, and 40 percent cerimolybdic acid on silica (50 percent support) was prepared. First ammonium dodecamolybdocerate was prepared by adding slowly a solution of 100 g. of ceric ammonium nitrate in 1,000 ml. of water to a stirred, boiling solution of 600 g. of ammonium heptamolybdate in 2,000 ml. of water. The preparation was allowed to cool, and the supernatant fluid was decanted. After washing the canary yellow granular 50 ml. of water was added, followed by 81 g. of niobium oxalate in 120 ml. of 10 percent oxalic acid solution. The yellow sol was heated on a hot plate with stirring for one hour, then evaporated to dryness on a steam bath. After drying overnight in an oven, it was calcined for 3 hours at 250° C. and for 2 hours at 450° C. in a muffle furnace. The catalyst composition was then crushed, sieved, and 150 ml. of 80 x 200-mesh material was charged to the fluid-bed reactor, where it was heated to reaction temperature in a stream of air.

The catalyst was tested at 460° C. and 1.1 seconds contact time. The feed stream comprised 353 ml. of propylene and 2,647 ml. of air per minute, STP. Over 14 minutes of reaction, 1.4 g. of acrylic acid and 0.85 g. of acrolein were recovered from the product stream. The conversion of acrylic acid was 9.0 percent at 13.5 percent yield; the conversion to acrolein was 6.9 percent at 10.4 percent yield.

EXAMPLE 29

The catalyst of the preceding example was then tested at 400° C. and 3.3 seconds contact time. The feed comprised 96 ml. of propylene, 722 ml. of air, and 289 ml. of water vapor per minute, STP. Over 52 minutes of reaction, 3.3 g. of acrylic acid, 1.8 g. of acetic acid, and 0.6 g. of acrolein were obtained in the product stream. The conversion to acrylic acid was 20.5 percent at 37.4 percent yield; the conversion to acetic acid was 13.6 percent at 24.8 percent yield; the conversion to acrolein was 4.8 percent at 8.9 percent yield.

EXAMPLE 30

The catalyst of Example 28 was then tested at 400° C. and 3.0 seconds contact time with no water vapor added to the feed. The feed stream comprised 106 ml. of propylene and 1,111 ml. of air per minute, STP. Over 47 minutes of reaction, 2.0 g. of acrylic acid, 0.76 g. of acetic acid, and 0.34 g. of acrolein were obtained in the product stream. The conversion to acrylic acid was 12.7 percent at 17.7 percent yield; the conversion to acetic acid was 5.7 percent at 7.9 percent yield; and the conversion to acrolein was 2.7 percent at 3.8 percent yield.

EXAMPLE 31

The catalyst of Example 28 was then tested at 500° C. and 2.2 seconds contact time. The feed stream comprised 100 ml. of propylene, 747 ml. of air, and 598 ml. of water vapor per minute, STP. Over 50 minutes of reaction, 1.34 g. of acrylic acid, 0.65 g. of acetic acid, and 0.61 g. of acrolein were obtained in the product stream. The conversion to acrylic acid was 8.4 percent at 12.5 percent yield; the conversion to acetic acid was 4.8 percent at 7.2 percent yield; and the conversion to acrolein was 4.9 percent at 7.3 percent yield.

EXAMPLE 32

A catalyst comprising 5 percent $As_2O_5$, 5 percent $Nb_2O_5$, and 45 percent chromimolybdic acid on silica (45 percent support) was prepared. To 600 g. of 30 percent silica aquasol, ammonia-stabilized, was added 23 ml. of $1HNO_3:3H_2O$ to acidify the sol. Then a solution of 81 g. of niobium oxalate, which contained 20 g. of $Nb_2O_5$, was prepared in 120 ml. of 10 percent aqueous oxalic acid and added to the stirred sol followed by a solution of 20 g. of $As_2O_5$ in 50 ml. of water. To the stirred sol was added 218.6 g. of pulverized ammonium hexamolybdochromate. The mixture was heated until it thickened, then evaporated to a solid on a steam bath. It was dried overnight in an oven at 115° C., then calcined 2 hr. at 250° C. and 2 hr. at 450° C. in a muffle furnace.

The catalyst was crushed, sieved, and 150 ml. of 80 x 200-mesh material was added to the laboratory fluid bed reactor, where it was tested at 400° C., and 1.5 sec. contact time. The feed stream comprised 212 ml. of propylene, 1587 ml. of air, and 635 ml. of water vapor per minute, STP. Over 24 min. of reaction, 3.25 g. of acrylic acid and 1.6 g. of acetic acid, as well as a small quantity of acrolein, were recovered in the product. The conversion to acrylic acid was 19.9 percent at 34.7 percent yield. The conversion to acetic acid was 11.5 percent at 20.1 percent yield.

EXAMPLE 33

The catalyst of Example 32 was regenerated by fluidizing it in air at 450° C. for 30 min. It was then tested at the same temperature and contact time as before, but with a feed stream comprising 168 ml. of propylene, 1259 ml. of air, and 1007 ml. of nitrogen per minute, STP. Over 30 min. of reaction, 2.62 g. of acrylic acid and 0.7 g. of acetic acid, as well as a small quantity of acrolein, was obtained in the product. The conversion to acrylic acid was 16.2 percent at 27.7 percent yield. The conversion to acetic acid was 5.3 percent at 9.1 percent yield.

EXAMPLE 34

A catalyst comprising 5 percent $As_2O_5$, 5 percent $Nb_2O_5$, and 40 percent silicomolybdic acid on silica (50 percent support) was prepared. To 667 g. of 30 percent silica aquasol which was stirred was added 26 ml. of dilute nitric acid, followed by 160 g. of silicomolybdic acid as 40 percent solution, 81 g. of niobium oxalate dissolved in 120 ml. of 10 percent oxalic acid in water and 20 g. of $As_2O_5$ in 50 ml. of water. The mixture was evaporated on a steam bath with stirring, dried in an oven, and calcined in a muffle furnace for 3 hr. at 250° C. and 2 hr. at 450° C.

The catalyst was crushed, sieved, and 150 ml. of 80 x 200-mesh material charged to the reactor where it was tested at 400° C. and 1.5 sec. contact time with a feed stream comprising 212 ml. of propylene, 1587 ml. of air, and 635 ml. of water vapor per minute, STP. Over 24 min. of reaction, 2.37 g. of acrylic acid and 0.5 g. of acetic acid, as well as a small amount of acrolein, were recovered in the product. The conversion to acrylic acid was 14.5 percent at 43.3 percent yield; the conversion to acetic acid was 4.0 percent at 12.0 percent yield.

EXAMPLE 35

The catalyst of Example 34 was regenerated by fluidization in air at 450° C. and tested at 460° C. and 2.2 sec. contact time. The feed comprised 132 ml. of propylene, 994 ml. of air, and 397 ml. of water vapor per minute, STP. Over 38 min. of reaction, 3.68 g. of acrylic acid and 1.0 g. of acetic acid were obtained in the product. The conversion to acrylic acid was 22.4 percent at 28.7 percent yield; the conversion to acetic acid was 7.3 percent at 9.3 percent yield.

EXAMPLE 36

The catalyst was regenerated as in Example 35 and tested at 430° C. and 2.2 sec. contact time. Water vapor was not added to the feed stream, which comprised 138 ml. of propylene, 1036 ml. of air, and 414 ml. of nitrogen per minute, STP. Over 36 min. of reaction 2.72 g. of acrylic acid and 0.7 g. of acetic acid were obtained in the product. The conversion to acrylic acid was 17.2 percent at 24.1 percent yield; the conversion to acetic acid was 5.1 percent.

EXAMPLE 37

A catalyst comprising 3 percent $As_2O_5$, 3 percent $Nb_2O_5$, and 24 percent silicomolybdic acid was prepared. Davison MSID fluid bed silica gel was sieved, and 56.6 g. of 80 x 200-mesh material was reserved for the preparation. This support amounts to 70 weight percent of the catalyst. To 15 ml. of water was added 2.4 g. of $As_2O_5$; solution was achieved by heating. This solution was added to a solution of 19.4 g. of silicomolybdic acid in 30 ml. of water to yield a straw yellow solution. This final solution was then slowly added to the silica gel in a Waring Blendor. Then a solution of 6.4 g. of niobium oxalate, containing 2.4 g. of $Nb_2O_5$, 2 g. of oxalic acid dihydrate, and 15 ml. of water was slowly added to the preparation. The preparation was blended for 15 min., transferred to an evaporating dish and heated to 160° C. on a hot plate.

To the fluid bed reactor was charged 150 ml. of catalyst; it was fluidized in air for 2 hr. at 450° C. before testing at 430° C. and 4.8 sec. contact time. The feed stream comprised 74 ml. of propylene, 553 ml. of air, and 221 ml. of water vapor per minute, STP. Over 68 min. of reaction, 1.45 g. of acrylic acid, and 0.5 g. of acetic acid was obtained in the product. The conversion to acrylic acid was 9.0 percent at 16.8 percent yield; the conversion to acetic acid was 3.4 percent at 6.3 percent yield.

EXAMPLE 38

A catalyst was prepared comprising 5 percent $As_2O_5$, 5.6 percent $Nb_2O_5$, 3.1 percent $Cr_2O_3$, and 34.8 percent $MoO_3$ on silica (51.5 percent support) wherein preparative conditions were such that chromimolybdic acid was formed in situ during the preparation. To 692 g. of stirred 30 percent silica aquasol was added 27 ml. of $1HNO_3:3H_2O$, followed by 173 g. of ammonium heptamolybdate tetrahydrate in 150 ml. of water, 32.0 g. of $Cr_2(SO_4)_3$ in 120 ml. of water, 59.3 g. of niobium oxalate, containing 20.0 g. of $Nb_2O_5$, in 100 ml. of 10 percent aqueous oxalic acid, and 20 g. of $As_2O_5$ in 50 ml. of water. The dark green mixture was heated to near the boiling point for 1¼ hr. with stirring, transferred to a steam bath and dried. It was calcined for 3 hr. at 250° C. and then for 2 hr. at 450° C. in a muffle furnace. To the laboratory reactor was charged 150 ml. of 80 x 200-mesh material.

The catalyst was tested at 400° C. and 1.5 sec. contact time with a feed stream comprising 168 ml. of propylene, 1259 ml. of air, and 1007 ml. of water vapor per minute, STP. Over 30 min. of reaction, 1.69 g. of acrylic acid and 1.0 g. of acetic acid was obtained in the product with a small amount of acrolein. The conversion to acrylic acid was 10.5% at 27.7 percent yield; the conversion to acetic acid was 7.3 percent at 19.5 percent yield.

EXAMPLE 39

A catalyst comprising 5 percent $As_2O_5$, 8 percent $Ta_2O_5$, and 40 percent cerimolybdic acid on silica (47 percent support) was prepared as described in Example 28 except that a solution of 148 g. of tantalum oxalate, containing 32.0 g. of $Ta_2O_5$, in 400 ml. of dilute aqueous oxalic acid was used in lieu of the niobium oxalate of Example 28. Then 150 ml. of 80 x 200-mesh catalyst was charged to the laboratory reactor and tested at 430° C. and 3.5 sec. contact time with a feed comprising 87 ml. of propylene, 651 ml. of air, and 260 ml. of water vapor per minute, STP. Over 58 min. of reaction, 1.63 g. of acrylic acid, 0.3 g. of acetic acid, and 1.20 g. of acrolein were obtained in the product. The conversion to acrylic acid was 10.1 percent at 23.1 percent yield; the conversion to acetic acid was 2.2 percent at 4.9 percent yield; and the conversion to acrolein was 9.5 percent at 21.8 percent yield.

EXAMPLE 40

The catalyst of Example 39 was regenerated by fluidizing in air at 450° C., and then it was tested at 460° C. and 3.5 sec. contact time. The feed comprised 83 ml. of propylene, 624 ml. of air, and 250 ml. of water vapor per minute, STP. Over 60 min. of reaction, 2.16 g. of acrylic acid, 0.37 g. of acetic acid, and 1.94 g. of acrolein were obtained in the product. The conversion to acrylic acid was 13.5 percent at 21.5 percent yield; the conversion to acetic acid was 2.8 percent at 4.4 percent yield; and the conversion to acrolein was 15.6 percent at 24.8 percent yield.

EXAMPLE 41

A catalyst comprising 5 percent $As_2O_5$, 2.5 percent $Nb_2O_5$, and 40 percent cerimolybdic acid on silica (52.5 percent support) was prepared as in Example 28, with appropriate changes in the quantities of niobium oxalate and silica sol taken. Then 150 ml. of 80 x 200-mesh catalyst was tested in the laboratory reactor at 460° C. and 2.2 sec. contact time. The feed comprised 105 ml. of propylene, 788 ml. of air, and 630 ml. of water vapor per minute, STP. Over 51 min. of reaction, 3.68 g. of acrylic acid, 0.82 g. of acetic acid, and 0.77 g. of acrolein were recovered in the product. The conversion to acrylic acid was 21.5 percent at 30.5 percent yield; the conversion to acetic acid was 5.7 percent at 8.1 percent yield; and the conversion to acrolein was 5.7 percent at 8.2 percent yield.

It will thus be seen from the above examples and description that the present invention provides, not only a novel process for the preparation of acrylic acid from propylene, but also novel catalyst compositions for this purpose. Specifically, these catalyst compositions are characterized by the fact that they contain niobium and/or tantalum, molybdenum, and optionally arsenic cerium, chromium, or silicon, and by the further fact that all these elements are present in oxidized form. The use of these novel catalysts affords a novel way to convert propylene to the corresponding alpha,beta-unsaturated monocarboxylic acids in high yields and by choosing the proper catalyst composition and by choosing suitable reaction conditions, the ratio of unsaturated acid to unsaturated aldehyde may be kept high. Other advantages will be apparent to those skilled in the art.

As will also be apparent to those skilled in the art, the invention has particular utility in connection with the production of acrylic acid which may be subsequently converted to lower alkyl esters for use in the plastics industry.

Although the invention has been described in considerable detail with particular reference to certain preferred embodiments thereof, variations and modifications may be effected within the spirit and scope of the invention as described hereinabove.

We claim:

1. A catalyst comprising a calcined mixture of an oxide, acid or salt compound of molybdenum, an oxide or salt compound of arsenic, and an oxide or salt compound of niobium, the amounts of said compounds being calculated on the basis of their oxides $MoO_3$, $As_2O_3$ and $Nb_2O_5$, respectively, and the analysis of the components on a weight percent basis, when expressed as the theoretical oxides is about:

$MoO_3$—8–50%.   $As_2O_3$—3–15%.
$Nb_2O_5$—4–30%.   Support—0–85%.

2. The catalyst of claim 1 wherein the analysis on a weight percent basis, when expressed as the theoretical oxides is about:

$MoO_3$—8–50%.   $As_2O_3$—3–15%.
$Nb_2O_5$—4–30%.   Support—30–70%.

3. The catalyst of claim 1 wherein the analysis on a weight percent basis, when expressed as the theoretical oxides is about:

$MoO_3$—20–37%.   $As_2O_3$—4–10%.
$Nb_2O_5$—10–15%.   Support—38–66%.

4. The catalyst of claim 1 wherein the support is silica.
5. The catalyst of claim 2 wherein the support is silica.
6. The catalyst of claim 3 wherein the support is silica.
7. A catalyst comprising a calcined mixture of an oxide, acid or salt compound of molybdenum, an oxide or salt compound of arsenic, and an oxide or salt compound of tantalum, the amounts of said compounds being calculated on the basis of their oxides $MoO_3$, $As_2O_3$ and $Ta_2O_5$, respectively, and the analysis of the components on a weight percent basis, when expressed as the theoretical oxides is about:

$MoO_3$—8–50%.   $As_2O_3$—3–15%.
$Ta_2O_5$—4–30%.   Support—0–85%.

8. The catalyst of claim 7 wherein the analysis on a weight percent basis, when expressed as the theoretical oxides is about:

$MoO_3$—8–50%.   $As_2O_3$—3–15%.
$Ta_2O_5$—4–30%.   Support—30–70%.

9. The catalyst of claim 7 wherein the analysis on a weight percent basis, when expressed as the theoretical oxides is about:

$MoO_3$—20–37%.   $As_2O_3$—4–10%.
$Ta_2O_5$—10–15%.   Support—38–66%.

10. The catalyst of claim 7 wherein the support is silica.
11. The catalyst of claim 8 wherein the support is silica.
12. The catalyst of claim 9 wherein the support is silica.

References Cited

UNITED STATES PATENTS

| 2,347,358 | 4/1944 | Milas | 260—533 |
| 2,776,316 | 1/1957 | Baldwin | 260—604 |
| 3,177,257 | 4/1965 | Detling et al. | 252—467 |
| 3,280,193 | 10/1966 | Whim | 252—456 |
| 3,318,863 | 5/1967 | Juveland | 252—465 |
| 3,342,849 | 9/1967 | Brill | 252—467 |
| 3,359,309 | 12/1967 | Young | 252—466 |

FOREIGN PATENTS

| 904,304 | 8/1962 | Great Britain | 260—533 |
| 990,639 | 4/1965 | Great Britain | 260—533 |

DANIEL E. WYMAN, Primary Examiner

P. E. KONOPKA, Assistant Examiner

U.S. Cl. X.R.

252—416, 443, 458, 462, 464, 467; 260—533, 604